(12) United States Patent
Isono et al.

(10) Patent No.: US 8,783,425 B2
(45) Date of Patent: Jul. 22, 2014

(54) DISC BRAKE DEVICE

(75) Inventors: Hiroshi Isono, Mishima (JP); Michio Suzuki, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 275 days.

(21) Appl. No.: 13/146,213

(22) PCT Filed: Apr. 23, 2010

(86) PCT No.: PCT/JP2010/057239
§ 371 (c)(1),
(2), (4) Date: Jul. 26, 2011

(87) PCT Pub. No.: WO2010/123100
PCT Pub. Date: Oct. 28, 2010

(65) Prior Publication Data
US 2011/0278104 A1 Nov. 17, 2011

(30) Foreign Application Priority Data

Apr. 23, 2009 (JP) .................................. 2009-104938

(51) Int. Cl.
*F16D 65/14* (2006.01)

(52) U.S. Cl.
USPC .................................................... 188/73.44

(58) Field of Classification Search
CPC ... F16D 65/2265; F16D 65/14; F16D 65/224; F16D 65/18
USPC ......................... 188/73.41–73.45, 73.31, 72.4
See application file for complete search history.

(56) References Cited

U.S. PATENT DOCUMENTS

| 7,337,881 B1 | 3/2008 | Sherman, II |
| 2011/0162918 A1 | 7/2011 | Isono et al. |

FOREIGN PATENT DOCUMENTS

| JP | 52 54790 | 4/1977 |
| JP | 8 4806 | 1/1996 |
| JP | 10 37987 | 2/1998 |
| JP | 11 287267 | 10/1999 |
| JP | 2006 194315 | 7/2006 |
| JP | 2006194315 A | * 7/2006 |

OTHER PUBLICATIONS

International Search Report issued Jul. 20, 2010 in PCT/JP10/057239 filed Apr. 23, 2010.

* cited by examiner

*Primary Examiner* — Melanie Torres Williams
(74) *Attorney, Agent, or Firm* — Oblon, Spivak, McClelland, Maier & Neustadt, L.L.P.

(57) ABSTRACT

A disc brake device is configured to include friction pads facing the friction surface of a disc rotor, a caliper and a piston capable of pushing the friction pads against the friction surface of the disc rotor, and a mounting for supporting the caliper in a freely movable manner to a vehicle body side through a slide mechanism including a slide pin and a sleeve. A positioning mechanism capable of changing a relative position of the slide pin and the sleeve is arranged to appropriately change the position of the caliper according to the wear of the pad and ensure stable retract function.

20 Claims, 5 Drawing Sheets

DISC BRAKE DEVICE

FIELD

The present invention relates to a disc brake device that pushes a disc rotor, which integrally rotates with a wheel, against a friction pad to act a braking force on the wheel through the disc rotor by the friction resistance.

BACKGROUND

A general caliper floating type disc brake device has a caliper supported to be movable in a rotation axis line direction of the wheel with respect to a mounting bracket. In this case, the caliper is supported in a freely movable manner by the mounting bracket by a slide mechanism including a pair of slide pins and a sleeve. The caliper has a U-shape that crosses the disc rotor, where an inner pad (friction pad) is supported in a freely movable manner on one side and an outer pad (friction pad) is supported in a freely movable manner on the other side. The disc rotor has an actuator including a piston for pushing the inner pad against the disc rotor arranged on one side.

Therefore, when the driver depresses the brake pedal, the actuator is operated by such tread force, whereby the piston moves forward to push the inner pad against the disc rotor and the caliper moves by the reaction force of when the piston moves forward to push the outer pad against the disc rotor. The disc rotor is thereby sandwiched by a pair of pads, so that the braking force acts on the wheel through the disc rotor.

In the disc brake device described above, when operation fluid is supplied to a fluid pressure chamber at the time of braking, the piston and the caliper move forward toward the disc rotor to push the pair of pads against the disc rotor. At the time of fluid pressure release from the fluid pressure chamber, the piston and the caliper can move backward to move away from the disc rotor by a retractor mechanism such as a rubber.

Such disc brake device including the retractor mechanism is described in patent literature 1. The disc brake device described in patent literature 1 includes a slide pin for guiding the movement of the caliper at the time of braking, and a retraction seal accommodated in a seal groove formed in the slide pin, where the caliper returns to the state before the movement by the elastic restoring force of the retraction seal at the time of depressurization after the braking.

CITATION LIST

Patent Literature

Patent Literature 1: Japanese Patent Application Laid-open No. H10-037987

SUMMARY

Technical Problem

In the conventional disc brake device described above, the retraction seal configuring the retraction mechanism is interposed between the slide pin and the arm of the caliper. In this case, the retraction seal compresses and deforms at the time of braking, so that the caliper can return by the elastic restoring force of the retraction seal at the time of depressurization. If the pad wears by long time use, the movement stroke of the caliper increases, so that the caliper cannot be sufficiently moved backward by the elastic restoring force of the retraction seal and a stable retraction cannot be obtained. In the conventional seal mechanism, the retractor amount becomes small when high fluid pressure is input thus causing dragging. If dragging occurs, it is difficult to avoid such dragging.

In view of solving the above problems, it is an object of the present invention to provide a disc brake device capable of ensuring a stable retract function by appropriately changing the position of the caliper according to the wear amount of the pad, disturbance, and the like.

Solution to Problem

In order to solve the above mentioned problems and achieve the object, a disc brake device according to the present invention includes a disc rotor that rotates about a rotation axis center; a friction pad that faces a friction surface of the disc rotor; a caliper capable of pushing the friction pad against the friction surface of the disc rotor; a mounting that supports the caliper in a freely movable manner to a vehicle body side through a slide mechanism including a slide pin and a sleeve; and a positioning mechanism capable of changing a relative position of the slide pin and the sleeve.

In the disc brake device according to the present invention, a retract mechanism that pulls back the caliper when the caliper moves forward is arranged between the slide pin and the sleeve.

In the disc brake device according to the present invention, the retract mechanism is defined with a maximum pull-back amount of the caliper.

In the disc brake device according to the present invention, the positioning mechanism changes the relative position of the slide pin and the sleeve when a relative movement amount of the slide pin and the sleeve exceeds the maximum pull-back amount of the caliper in the retract mechanism.

In the disc brake device according to the present invention, the positioning mechanism changes the relative position of the slide pin and the sleeve when a relative movement amount of the slide pin and the sleeve exceeds a predetermined pull-back amount set in advance in the caliper in the retract mechanism.

The disc brake device according to the present invention further includes an elastic member interposed between the slide pin and the sleeve so as to be compressed and deformed when the caliper moves forward; and a movable element interposed between the slide pin and the sleeve so as to be movable following the deformation of the elastic member and to define a maximum compression deformation amount of the elastic member, wherein the positioning mechanism allows the relative movement of the slide pin and the movable element or the sleeve and the movable element when the compression deformation amount of the elastic member becomes a maximum to change the relative position of the slide pin and the sleeve.

The disc brake device according to the present invention further includes an elastic member interposed between the slide pin and the sleeve so as to be compressed and deformed when the caliper moves forward; and a movable element interposed between the slide pin and the sleeve so as to be movable following the deformation of the elastic member and to define a maximum compression deformation amount of the elastic member, wherein the positioning mechanism allows the relative movement of the slide pin and the movable element or the sleeve and the movable element when the compression deformation amount of the elastic member becomes a predetermined value set in advance to change the relative position of the slide pin and the sleeve.

In the disc brake device according to the present invention, the elastic member includes a plurality of elastic members having different elastic properties, the plurality of elastic members are arranged in series among the slide pin, the movable element, and the sleeve.

In the disc brake device according to the present invention, the elastic members are arranged between the slide pin and the movable element, and between the movable element and the sleeve.

The disc brake device according to the present invention further includes a fluid pressure chamber provided between the caliper and the piston by accommodating a relatively movable piston in the caliper, wherein the pair of friction pads are capable of pushing against the friction surface positioned on both sides of the disc rotor when the caliper and the piston are relatively move at the time of pressurization of the fluid pressure chamber, and a pressurization force of the fluid pressure chamber acts between the slide pin and the sleeve.

In the disc brake device according to the present invention, a starting load of the caliper is set to be greater than a starting load of the piston.

In the disc brake device according to the present invention, at least one pressure receiving side of the slide pin, the movable element, and the sleeve is formed to a step shape having a small diameter.

In the disc brake device according to the present invention, the slide pin is formed with a fluid pressure passage that acts a hydraulic pressure of the fluid pressure chamber between the slide pin and the sleeve, and includes a breeder that discharges an air mixed in the fluid pressure passage.

Advantageous Effects of Invention

According to the disc brake device of the present invention, the disc rotor, the friction pad, the caliper, and the mounting are arranged, and a positioning mechanism capable of changing the relative position of the slide pin and the sleeve is arranged. Therefore, the relative position of the slide pin and the sleeve is changed by the positioning mechanism according to the wear of the pad, so that the position of the caliper is appropriately maintained and a stable retract function can be ensured.

DESCRIPTION OF EMBODIMENTS

An example of a disc brake device according to the present invention will be specifically described below based on the drawings. It should be recognized that the present invention is not limited by such example. The configuring elements in the following example include those that can be replaced or easily contrived by those skilled in the art or those that are substantially the same.

First Example

Figure 1:
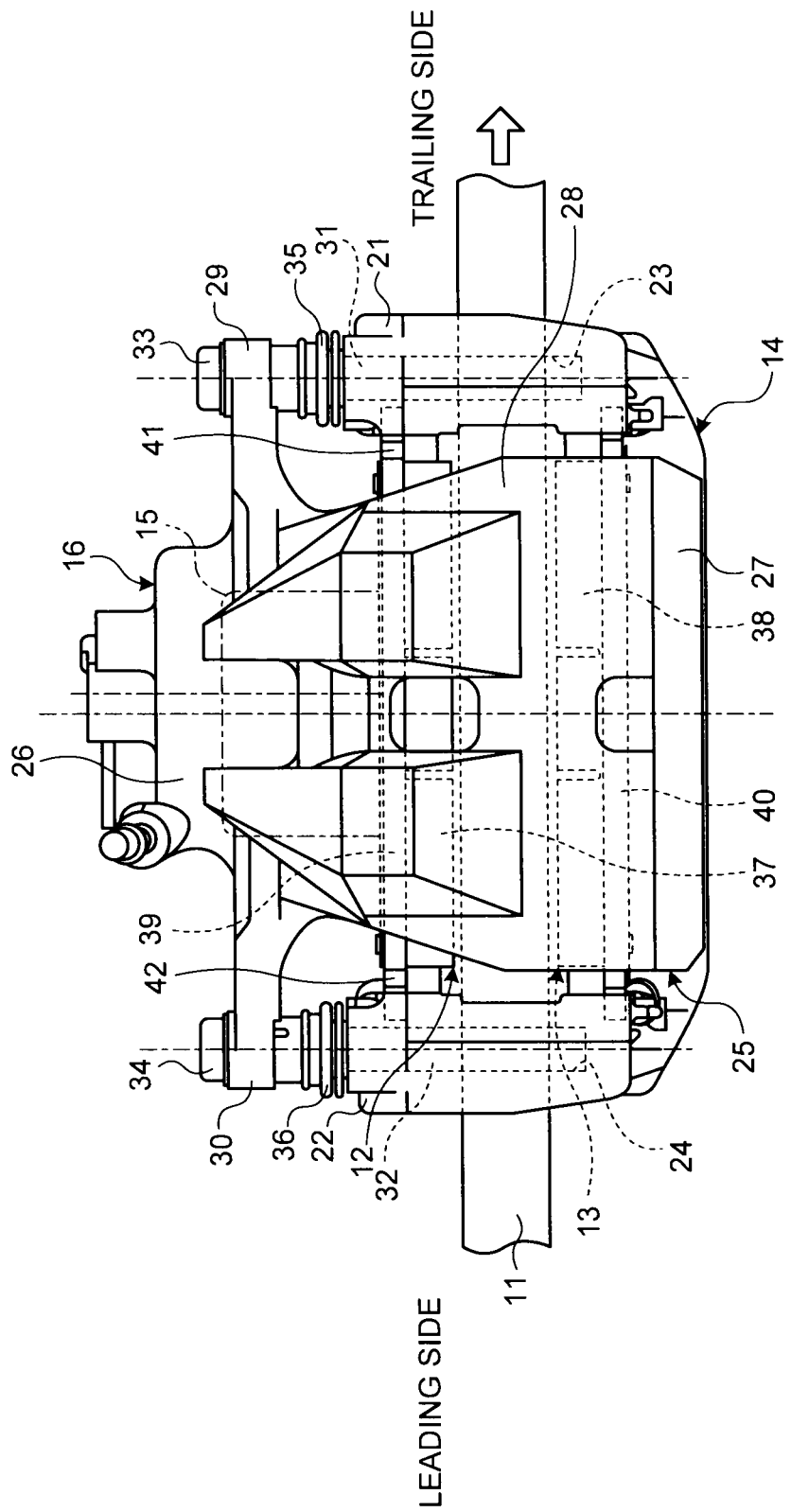
FIG. 1 is a schematic view showing a disc brake device according to a first example of the present invention.
Figure 2:
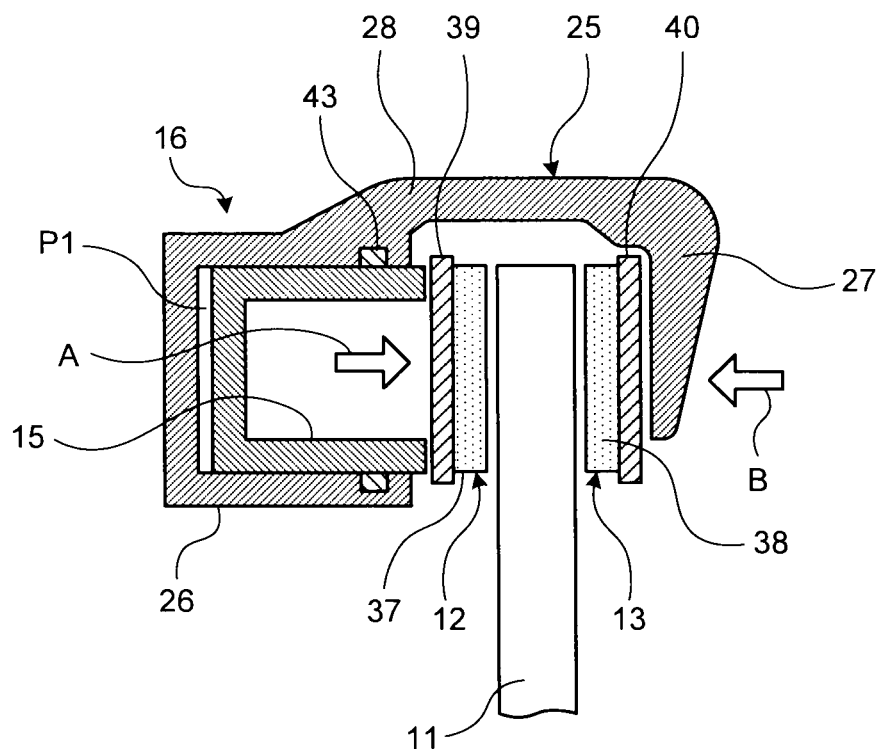
FIG. 2 is a cross-sectional view showing the disc brake device of the first example.
Figure 3:
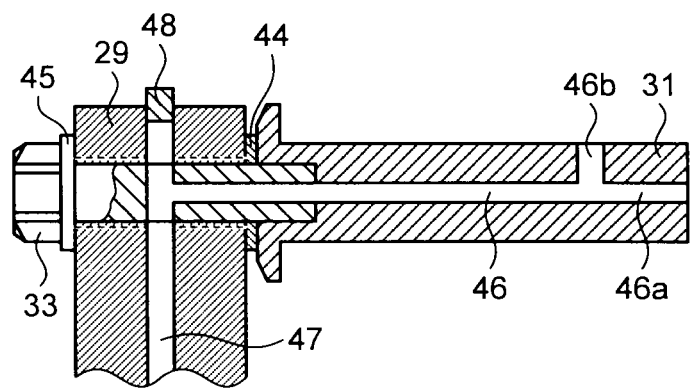
FIG. 3 is a cross-sectional view showing a coupling portion of a caliper and a slide pin in the disc brake device of the first example.
Figure 4:
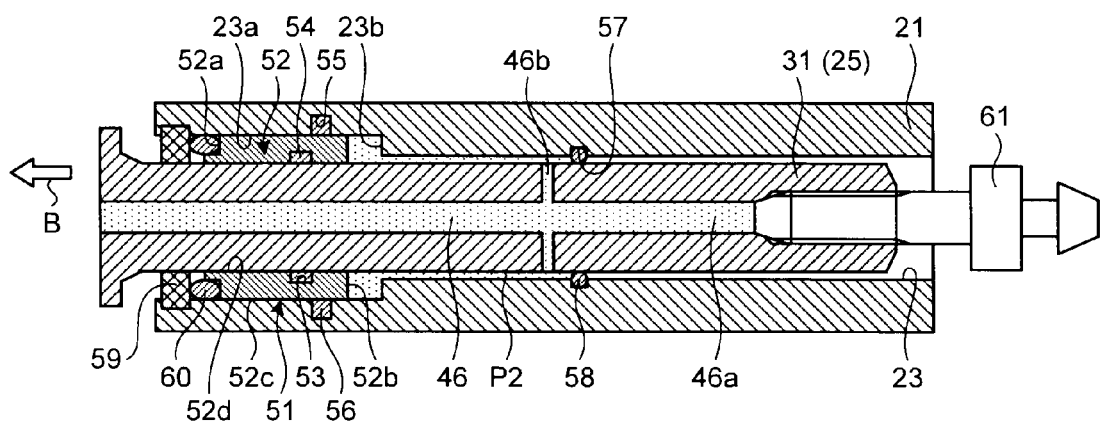
FIG. 4 is a cross-sectional view showing a slide mechanism in the disc brake device of the first example.

FIG. 1 is a schematic view showing a disc brake device according to a first example of the present invention, FIG. 2 is a cross-sectional view showing the disc brake device of the first example, FIG. 3 is a cross-sectional view showing a coupling portion of a caliper and a slide pin in the disc brake device of the first example, and FIG. 4 is a cross-sectional view showing a slide mechanism in the disc brake device of the first example.

Although not shown, the disc brake device of the first example is a device that applies a braking force on a wheel rotatably supported in a vehicle, and includes a disc rotor arranged to freely rotate integrally with the wheel, and a pair of friction pads that is arranged in a relatively non-rotatable manner with the wheel on a vehicle body side and that sandwiches the disc rotor to apply a friction resistance force.

In other words, as shown in FIG. 1 and FIG. 2, the disc brake device is configured by a disc rotor 11 that rotates about a rotation axis center of an axle integrally with the wheel, a pair of friction pads 12, 13 facing the friction surfaces on both sides of the disc rotor 11, a mounting bracket 14 for supporting the pair of friction pads 12, 13 so as to move closer or move away from the friction surface of the disc rotor 11, and a cylinder mechanism 16 capable of pushing the pair of friction pads 12, 13 against the disc rotor 11 with a piston 15.

Specifically describing, the mounting bracket 14 is fixed on the vehicle body side, and a pair of sleeves 21, 22 is integrally arranged on both sides, that is, the front and the back in the rotation direction of the disc rotor 11. Each sleeve 21, 22 includes a fit-in hole 23, 24 in which one end is opened and the other end is blocked.

A caliper 25 has a U-shaped bridge across the disc rotor 11 and is mounted with the cylinder mechanism 16 including the piston 15, the cylinder mechanism 16 being configured by an actuator that can freely move the piston 15 forward and backward. The caliper 25 is configured by a cylinder portion 26 including the cylinder mechanism 16, a reaction portion 27 arranged at a position facing the cylinder portion 26 with the disc rotor 11 in between, and a coupling portion 28 for coupling the cylinder portion 26 and the reaction portion 27.

The caliper 25 includes a pair of arms 29, 30 integrally arranged on both sides, that is, the front and the back in the rotation direction of the disc rotor 11. Each arm 29, 30 has a basal end of a slide pin 31, 32 fixed by a fixing bolt 33, 34, respectively. Each slide pin 31, 32 has the distal end fitted in a freely movable manner to the fit-in hole 23, 24 formed in each sleeve 21, 22 of the mounting bracket 14. A boot 35, 36 for covering the fit-in gap between the slide pin 31, 32 and the fit-in hole 23, 24 is attached between the arm 29, 30 and the sleeve 21, 22. In this case, the slide pins 31, 32 and the sleeves 21, 22 configure the slide mechanism of the caliper 25.

Therefore, the caliper 25 is movable in the rotation axis line direction of the disc rotor 11, that is, the direction orthogonal to the rotation direction with respect to the mounting bracket 14.

The pair of friction pads 12, 13 arranged facing the friction surfaces on both sides of the disc rotor 11 are an inner pad 12 arranged on the cylinder portion 26 side and an outer pad 13 arranged on the reaction portion 27 side in the caliper 25. The inner pad 12 and the outer pad 13 are configured by fixing the basal ends of friction materials 37, 38 to back metals 39, 40.

The inner pad 12 has the front and back ends of the back metal 39 supported by a pair of guide members 41, 42 formed in the mounting bracket 14. The front surface of the piston 15 of the cylinder mechanism 16 attached to the cylinder portion 26 of the caliper 25 is brought into contact with the basal end face of the back metal 39 in the inner pad 12. The outer pad 13 has the back metal 40 fixed or supported in a freely movable manner by the reaction portion 27 of the caliper 25.

The cylinder mechanism 16 has the piston 15 supported in a freely movable manner by the cylinder portion 26, and a seal mechanism 43 for sealing with respect to the outer surface of the piston 15 attached to the inner surface of the cylinder portion 26. The fluid pressure chamber P1 is partitioned by the cylinder portion 26, the piston 15, and the seal mechanism 43, and the distal end of the piston 15 faces the back metal 39 of the inner pad 12.

Therefore, when operation fluid is supplied to the fluid pressure chamber P1 of the cylinder mechanism 16 for pressurization, the piston 15 moves forward in the direction of the arrow A, and the front surface of the piston 15 pushes the back metal 39 of the inner pad 12, so that the front surface of the inner pad 12 can be brought close to the friction surface of the disc rotor 11. In this case, the caliper 25 advances in the opposite direction from the piston 15, that is, the direction of the arrow B by the movement reaction force of when the piston 15 moves forward, so that the pushing surface of the outer pad 13 can be brought close to the friction surface of the disc rotor 11. The forward directions A, B of the piston 15 and the caliper 25 are directions of moving towards the disc rotor 11 and pushing each pad 12, 13 against the disc rotor 11.

When the inner pad 12 and the outer pad 13 are pushed against each friction surface of the disc rotor 11, the friction resistance force generates between the inner pad 12 and the outer pad 13 and the rotating disc rotor 11, and the braking force is applied on the disc rotor 11.

In the disc brake device of the first example, a retract mechanism for pulling back the caliper 25 at the time of depressurization is arranged between the slide pins 31, 32 arranged on the caliper 25 side and the sleeves 21, 22 arranged on the mounting bracket 14 side.

As shown in FIG. 3, the basal end of the slide pin 31 is closely attached to the arm 29 of the caliper 25 through a washer 44, the fixing bolt 33 is passed through the arm 29 through a washer 45, and the distal end is passed through the washer 44 and screw fitted to the basal end of the slide pin 31. A fluid pressure passage 46 extending from the distal end side towards the intermediate portion of the fixing bolt 33 is formed at the shaft center position of the slide pin 31, and a coupling passage 47 passing through the fixing bolt 33 from the distal end side of the arm 29 and extending to the fluid pressure chamber P1 is formed in the arm 29 of the caliper 25. The fluid pressure passage 46 has the distal end side branched into two, and includes a first passage 46a opened to the distal end face and a second passage 46b opened to the side surface. A fluid sealing plug 48 is fixed at the end of the coupling passage 47.

As shown in FIG. 4, the retract mechanism 51 is arranged between the slide pin 31 and the sleeve 21. In the first example, the retract mechanism 51 includes a positioning mechanism capable of changing the relative position of the slide pin 31 and the sleeve 21. The retract mechanism 51 defines the maximum pull-back amount of the caliper 25, where the positioning mechanism changes the relative position of the slide pin 31 and the sleeve 21 when the relative movement amount of the slide pin 31 and the sleeve 21 exceeds the maximum pull-back amount of the caliper 25 in the retract mechanism 51. In the following description, the forward direction is the direction the slide pin 31 and the caliper 25 move with respect to the sleeve 21 to push the pad 13 against the disc rotor 11 (direction B in FIG. 2), and the backward direction is the direction the slide pin 31 and the caliper 25 are moved with respect to the sleeve 21 to move the pad 13 away from the disc rotor 11.

In other words, the slide pin 31 is supported in a freely movable manner in the axial direction with a predetermined gap in the fit-in hole 23 of the sleeve 21. An accommodation groove 23a continuing in the peripheral direction is formed over a predetermined length on the inner peripheral surface of the fit-in hole 23, which accommodation groove 23a is opened in the forward direction (direction B in FIG. 4) of the slide pin 31 (caliper 25) and has a step portion 23b formed in the backward direction. A movable element 52 serving as a positioning mechanism that can relatively move with the slide pin 31 is inserted in the accommodation groove 23a of the sleeve 21. The movable element 52 has a cylindrical shape and has a square cross-sectional shape, and includes a step portion 52a formed on the opening side of the accommodation groove 23a, a back surface 52b facing the step portion 23b, an outer peripheral surface 52c facing the inner wall surface of the accommodation groove 23a, and an inner peripheral surface 52d facing the outer peripheral surface of the slide pin 31.

The movable element 52 has a ring groove 53 having a ring shape formed on the inner peripheral surface 52d, and a seal member 54 that exhibits the seal function with the slide pin 31 is attached to the ring groove 53. The sleeve 21 has a ring groove 55 having a ring shape formed on the inner peripheral surface corresponding to the accommodation groove 23a, and a seal member 56 that exhibits the seal function with the movable element 52 is attached to the ring groove 55. The seal member 54 has a higher elastic force than the seal member 56. Furthermore, the sleeve 21 has a ring groove 57 having a ring shape formed on the inner peripheral surface, and a seal member 58 that exhibits the seal function with the slide pin 31 is attached to the ring groove 57.

The fluid pressure passage 46 communicating to the fluid pressure chamber P1 (see FIG. 2) has the second passage 46b communicating to between the slide pin 31 and the sleeve 21. The communicating portion of the second passage 46b is the fluid pressure chamber P2 partitioned by each seal member 54, 56, 58. That is, the seal member 54 is pushed to the movable element 52 and the slide pin 31 and sets a predetermined strain force in between. The seal member 56 is pushed to the movable element 52 and the sleeve 21, and sets a predetermined strain force in between. The seal member 58 is pushed to the slide pin 31 and the sleeve 21, and sets a predetermined strain force in between. Therefore, the operation fluid supplied to the fluid pressure chamber P2 from the fluid pressure chamber P1 through the fluid pressure passage 46 is sealed between the slide pin 31, the sleeve 21, and the movable element 52 so that the leakage to the outside is prevented.

A stopper 59 having a ring shape is fixed to the inner peripheral surface on the opening side in the accommodation groove 23a. An elastic member 60 is arranged in the accommodation groove 23a while being positioned between the movable element 52 and the stopper 59. The elastic member 60 is a rubber member having a ring shape, and is pushed to the stopper 59 while being supported by the step portion 52a of the movable element 52 to set a predetermined strain force between the movable element 52 and the accommodation groove 23a (sleeve 21).

The movable element 52 is biased in the backward direction of the slide pin 31 by the elastic force of the elastic member 60, where a predetermined gap is ensured between the back surface 52b of the movable element 52 and the step portion 23b of the sleeve 21 at the time of no-pressurization to the fluid pressure chamber P2. At the time of pressurization to the fluid pressure chambers P1, P2, the movable element 52 moves forward with the slide pin 31 thus compressing the elastic member 60. In this case, the elastic member 60 configuring the retract mechanism 51 has the elastic recovery amount defined as the maximum pull-back amount of the caliper 25.

In the present example, the movable element 52, the stopper 59, and the elastic member 60 function as the retract mechanism 51, and the retract mechanism 51 and the seal mechanism are arranged independently and individually.

In the present example, when the operation fluid is supplied to the fluid pressure chamber P1 for pressurization, such fluid pressure acts on the piston 15 and also acts on the fluid pressure chamber P2 through the fluid pressure passage 46. The starting load of the caliper 25 is set to be greater than the starting load of the piston 15. In this case, the starting load of the caliper 25 is such that the compression load of the elastic member 60 is applied on the friction load of the seal member 56, and the starting load of the piston 15 is the friction load of the seal mechanism 43.

When pressurization to the fluid pressure chambers P1, P2 is continued, the movable element 52 further moves forward with the slide pin 31 thus compressing and maximally deforming the elastic member 60, so that the step portion 52a of the movable element 52 can be brought into contact with the stopper 59 and the movable element 52 functions as a positioning mechanism for defining the maximum compression deformation amount of the elastic member 60.

The slide pin 31 has the fluid pressure passage 46 formed at the center portion, and a breeder 61 for discharging the air mixed in the fluid pressure passage 46 is arranged at the distal end of the first passage 46a.

In the above description, the slide mechanism (slide pin 31 and sleeve 21) on one side of the caliper has been described, but the slide mechanism (slide pin 32 and sleeve 22) on the other side also has a similar configuration, and hence the detailed description will be omitted.

As shown in FIG. 2 and FIG. 4, when the operation fluid is supplied to the fluid pressure chamber P1 for pressurization, the piston 15 and the caliper 25 move forward to push the pads 12, 13 against the disc rotor 11. In this case, the piston 15 moves forward in the direction of the arrow A in FIG. 2 and then the caliper 25 moves forward in the direction of the arrow B in FIG. 2 since the starting load of the caliper 25 is set greater than the starting load of the piston 15.

When the operation fluid is supplied to the fluid pressure chamber P2 for pressurization, the slide pin 31 and the movable element 52 move forward. At the time of pressurization to the fluid pressure chamber P2, the movable element 52 moves forward with the slide pin 31 thus compressing and deforming the elastic member 60. In this case, the compression deformation amount of the elastic member 60 by the movable element 52 becomes the return amount of the slide pin 31, that is, the caliper 25. Furthermore, when pressurization to the fluid pressure chamber P2 is continued, the movable element 52 stops as the step portion 52a is brought into contact with the stopper 59, so that the maximum compression deformation amount of the elastic member 60 by the movable element 52 is defined, and the maximum return amount of the slide pin 31, that is, the caliper 25 is also defined.

When the operation fluid is discharged from the fluid pressure chambers P1, P2 for depressurization, the slide pin 31 and the movable element 52 integrally move backward by the restoring force of the compressed and deformed elastic member 60. In this case, the slide pin 31 (caliper 25) is returned to the original position and the pushing against the disc rotor 11 by the pads 12, 13 is released since the slide pin 31 and the movable element 52 do not relatively move.

When the pads 12, 13 wear, the slide pin 31 moves forward more than necessary, and relatively moves with the movable element 52. In other words, when the operation fluid is supplied to the fluid pressure chamber P2 for pressurization, the slide pin 31 and the movable element 52 move forward, similar to the above. If the slide pin 31 and the movable element 52 are integrally moved forward and the elastic member 60 is maximally compressed and deformed, the movable element 52 stops as the step portion 52a is brought into contact with the stopper 59. If the slide pin 31 and the movable element 52 move forward by greater than or equal to the maximum compression deformation amount of the elastic member 60, the forward movement of the slide pin 31 is permitted with respect to the stopped movable element 52, and the slide pin 31 is moved forward by a predetermined amount, that is, the wear amount of the pads 12, 13. In this case as well, the compression deformation amount of the elastic member 60 becomes the return amount of the slide pin 31, that is, the caliper 25 since the maximum compression deformation amount of the elastic member 60 by the movable element 52 is defined.

When the operation fluid is discharged from the fluid pressure chambers P1, P2 for depressurization, the slide pin 31 and the movable element 52 integrally move backward by the restoring force of the compressed and deformed elastic member 60. At the time of the backward movement, the slide pin 31 (caliper 25) is returned by the maximum compression deformation amount of the elastic member 60 and the pushing against the disc rotor 11 by the pads 12, 13 is released since the slide pin 31 and the movable element 52 do not relatively move. In this case, the relative position of the slide pin 31 and the movable element 52 becomes the position at which the slide pin 31 is moved forward by the wear amount of the pads 12, 13 with respect to the original position relationship, where the relative position is changed according to the wear amount of the pads 12, 13.

In the disc brake device of the first example, the disc rotor 11 that rotates about the rotation axis center, opposing pads 12, 13 facing the friction surfaces of the disc rotor 11, the caliper 25 and the piston 15 for pushing the pads 12, 13 against the friction surfaces of the disc rotor 11, and the mounting bracket 14 for supporting the caliper 25 in a freely movable manner towards the vehicle body side through a slide mechanism including the slide pins 31, 32 and the sleeves 21, 22 are arranged, where the movable element 52 serving as the positioning mechanism capable of changing the relative position of the slide pins 31, 32 and the sleeves 21, 22 is arranged.

Therefore, the caliper 25 and the piston 15 move forward, the movable element 52 moves forward with the slide pins 31, 32 to compress and deform the elastic member 60 to push the pads 12, 13 against the disc rotor 11 and the slide pins 31, 32 and the movable element 52 relatively move when the deformation amount of the elastic member 60 becomes a maximum at the time of pressurization of the fluid pressure chamber P2, and the slide pins 31, 32 and the movable element 52 are returned by the maximum deformation amount of the elastic member 60, the slide pins 31, 32 can be returned by the compression deformation amount of the elastic member 60 regardless of the forward moving amount of the slide pins 31, 32, and the relative position of the slide pins 31, 32 and the sleeves 21, 22 is changed by the positioning mechanism according to the wear of the pads 12, 13 at the time of depressurization of the fluid pressure chamber P2, so that the position of the caliper 25 can be appropriately maintained and the stable retract function can be ensured.

In the disc brake device of the first example, the retract mechanism 51 for pulling back the caliper 25 when the caliper 25 moved forward is arranged between the slide pins 31, 32 and the sleeves 21, 22. Therefore, the caliper 25 can be appropriately returned through the slide pins 31, 32 by the retract mechanism 51, and the dragging of the pads 12, 13 can be prevented.

Furthermore, in the disc brake device of the first example, the maximum pull-back amount of the caliper 25 is defined by the retract mechanism 51. Therefore, the caliper 25 can be appropriately returned within a range of a predetermined stroke through the slide pins 31, 32 by the retract mechanism 51.

In the disc brake device of the first example, the positioning mechanism (movable element 52) changes the relative position of the slide pins 31, 32 and the sleeves 21, 22 when the relative movement amount of the slide pins 31, 32 and the sleeves 21, 22 exceeds a maximum pull-back amount of the caliper 25 in the retract mechanism 51. Therefore, the slide pins 31, 32 and the movable element 52 are returned by the maximum pull-back amount even if the pads 12, 13 wear and the slide pins 31, 32 and the sleeves 21, 22 relatively move, so that the relative position of the slide pins 31, 32 and the sleeves 21, 22 can be appropriately changed and the caliper 25 can be positioned at an appropriate position. In this case, a constant return amount can be ensured at the beginning of input of the braking force, that is, the beginning of input of the fluid pressure.

Furthermore, in the disc brake device of the first example, the elastic member 60 that can be compressed and deformed with the caliper 25 moves forward is interposed between the slide pins 31, 32 and the sleeves 21, 22, the movable element 52 that can move following the deformation of the elastic member 60 and that defines the maximum compression deformation amount of the elastic member 60 is arranged between the slide pins 31, 32 and the sleeves 21, 22, and the relative movement of the slide pins 31, 32 and the movable element 52 is permitted when the compression deformation amount of the elastic member 60 becomes a maximum, thereby changing the relative position of the slide pins 31, 32 and the sleeves 21, 22. Therefore, the position of the caliper 25 can be appropriately maintained according to the wear of the pads 12, 13 and the stable retract function can be ensured with a simple configuration.

In the disc brake device of the first example, the relatively movable piston 15 is accommodated in the caliper 25 to arrange the fluid pressure chamber P1 in between, where the caliper 25 and the piston 15 relatively move at the time of pressurization of the fluid pressure chamber P1 to push the pads 12, 13 against the friction surfaces positioned on both sides of the disc rotor 11, and the pressurization force of the fluid pressure chamber P1 is acted on the fluid pressure chamber P2 between the slide pins 31, 32 and the sleeves 21, 22. Therefore, the operability of the caliper 25 can be enhanced and the stable retractor amount can be ensured by separating the liquid seal and the retractor function.

In the disc brake device of the first example, the starting load of the caliper 25 is set greater than the starting load of the piston 15. Therefore, the piston 15 moves forward so that the pad 12 is brought into contact with the disc rotor 11, and thereafter, the caliper 25 moves forward so that the pad 13 is brought into contact with the disc rotor 11 at the time of pressurization of the fluid pressure chamber P1, whereby the return amount of the caliper 25 can be appropriately ensured.

In the disc brake device of the first example, the fluid pressure passage 46 that acts the fluid pressure of the fluid pressure chamber P1 between the slide pins 31, 32 and the sleeves 21, 22 is formed and the breeder 61 for exhausting the air mixed into the fluid pressure passage 46 is arranged in the slide pins 31, 32. Therefore, satisfactory operability of the caliper 25 and the piston 15 can be ensured and lack of braking force can be suppressed by exhausting the air mixed into the fluid pressure passage 46 using the breeder 61. The breeder for exhausting air does not need to be separately arranged, so that lower weight and lower cost can be realized.

Second Example

Figure 5:
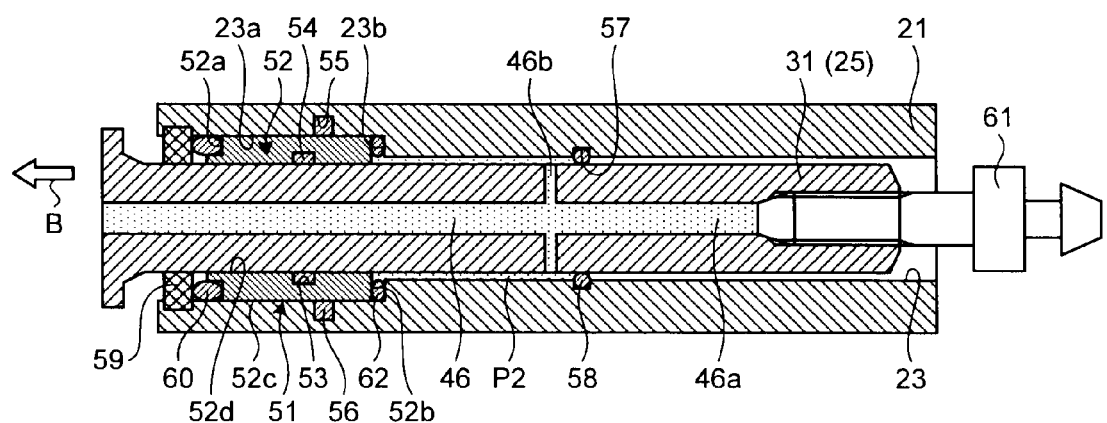
FIG. 5 is a cross-sectional view showing a slide mechanism in a disc brake device according to a second example of the present invention.

FIG. 5 is a cross-sectional view showing a slide mechanism in a disc brake device according to a second example of the present invention. The same reference numerals are denoted for the members having functions similar to those described in the example above, and redundant description will be omitted.

As shown in FIG. 5, in the disc brake device of the second example, the retract mechanism 51 is arranged between the slide pin 31 and the sleeve 21, which retract mechanism 51 includes a positioning mechanism capable of changing the relative position of the slide pin 31 and the sleeve 21.

The sleeve 21 has the movable element 52 inserted to the accommodation groove 23a. The movable element 52 has the seal member 54 attached to the ring groove 53, and the sleeve 21 has the seal member 56 attached to the ring groove 55 and the seal member 58 attached to the ring groove 57. Therefore, the operation fluid supplied to the fluid pressure chamber P2 from the fluid pressure chamber P1 through the fluid pressure passage 46 is sealed between the slide pin 31, the sleeve 21, and the movable element 52 by each seal member 54, 56, 58 so that the leakage to the outside is prevented.

The accommodation groove 23a has the stopper 59 fixed to the inner peripheral surface on the opening side, and the elastic member 60 is arranged between the movable element 52 and the stopper 59. The elastic member 62 is arranged between the back surface 52b of the movable element 52 and the step portion 23b of the sleeve 21. Each elastic member 60, 62 is a rubber member having a ring shape, and elastically supports the movable element 52 in the accommodation groove 23a. That is, the elastic member 60, 62 floating supports the movable element 52 in the accommodation groove 23a, that is, biasedly supports the movable element 52 so as to be movable in the forward direction and the backward direction of the slide pin 31.

Therefore, the movable element 52 moves forward with the slide pin 31 and compresses the elastic member 60 at the time of initial pressurization to the fluid pressure chamber P2, and the movable element 52 moves backward with the slide pin 31 and compresses the elastic member 62 at the time of depressurization.

The operations other than the elastic member 62 are similar to the first example described above, and thus the description will be omitted.

In the disc brake device of the second example, the elastic member 60 is arranged on the front side of the movable element 52 and the elastic member 62 is arranged on the back side. Therefore, the movable element 52 is biased and supported so as to be movable in the forward direction and the backward direction in the accommodation groove 23a by the elastic members 60, 62, so that the elastic member 60 is compressed when the movable element 52 moves forward and the elastic member 62 is compressed when the movable element 52 moves backward. Thus, even if the disc rotor 11 moves as if collapsing in the axial direction when the vehicle pivots, the movable element 52 can absorb the same, where the collapse of the disc rotor 11 is returned in the direct traveling after the pivot of the vehicle thereby returning the caliper 25 to a predetermined position, suppressing the increase of the operation fluid amount and enhancing the brake feeling.

Third Example

Figure 6:
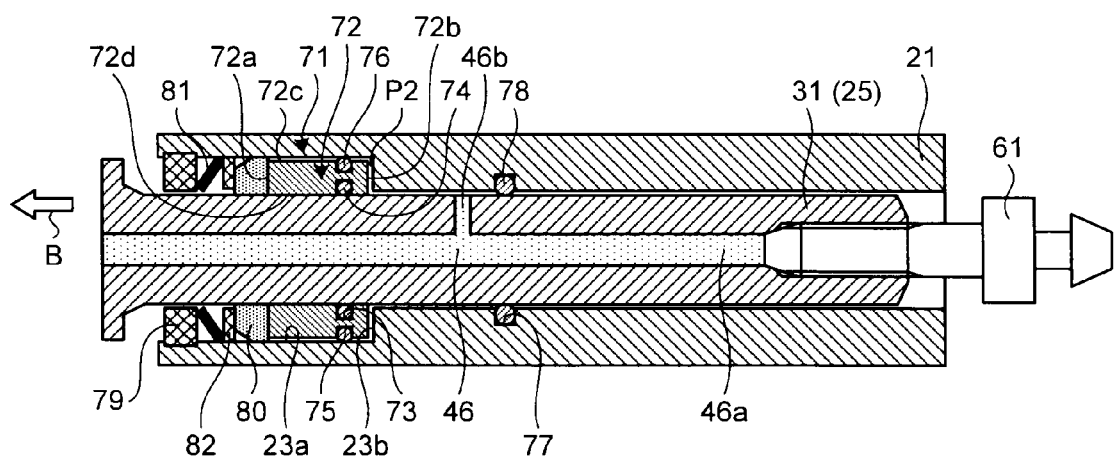
FIG. 6 is a cross-sectional view showing a slide mechanism in a disc brake device according to a third example of the present invention.

FIG. 6 is a cross-sectional view showing a slide mechanism in a disc brake device according to a third example of the present invention. The entire configuration of the disc brake device of the present example is substantially similar to the first example described above and will be described using FIG. 1 and FIG. 2, where the same reference numerals are denoted for members having functions similar to those described in the example and redundant description will be omitted.

As shown in FIG. 6, in the disc brake device of the third example, a retract mechanism 71 is arranged between the slide pin 31 and the sleeve 21, which retract mechanism 71 includes a positioning mechanism capable of changing the relative position of the slide pin 31 and the sleeve 21.

In other words, the slide pin 31 is supported in a freely movable manner in the axial direction with a predetermined gap in the fit-in hole 23 of the sleeve 21. The accommodation groove 23a continuing in the peripheral direction is formed over a predetermined length on the inner peripheral surface of the fit-in hole 23, which accommodation groove 23a is opened in the forward direction of the slide pin 31 (caliper 25) and has a step portion 23b formed in the backward direction. A movable element 72 serving as a positioning mechanism that can relatively move with the slide pin 31 is inserted in the accommodation groove 23a of the sleeve 21. The movable element 72 has a cylindrical shape and has a square cross-sectional shape, and includes a front surface 72a formed on the opening side of the accommodation groove 23a, a back surface 72b facing the step portion 23b, an outer peripheral surface 72c facing the inner wall surface of the accommodation groove 23a, and an inner peripheral surface 72d facing the outer peripheral surface of the slide pin 31.

The movable element 72 has a ring groove 73 having a ring shape formed on the inner peripheral surface 72d, and a seal member 74 that exhibits the seal function with the slide pin 31 is attached to the ring groove 73. The movable element 72 has a ring groove 75 having a ring shape formed on the outer peripheral surface 72c, and a seal member 76 that exhibits the seal function with the sleeve 21 is attached to the ring groove 75. The seal member 74 has a higher elastic force than that of the seal member 76. Furthermore, the sleeve 21 has a ring groove 77 having a ring shape formed on the inner peripheral surface, and a seal member 78 that exhibits the seal function with the slide pin 31 is attached to the ring groove 77.

The fluid pressure passage 46 has the second passage 46b communicating to between the slide pin 31 and the sleeve 21. The communicating portion of the second passage 46b is the fluid pressure chamber P2 partitioned by each seal member 74, 76, 78. That is, the operation fluid supplied to the fluid pressure chamber P2 from the fluid pressure chamber P1 through the fluid pressure passage 46 is sealed between the slide pin 31, the sleeve 21, and the movable element 72 so that the leakage to the outside is prevented.

A stopper 79 having a ring shape is fixed to the inner peripheral surface on the opening side in the accommodation groove 23a. A low elastic member 80 and a high elastic member 81 are arranged in series through a supporting ring 82 while being positioned between the movable element 72 and the stopper 79 in the accommodation groove 23a. The low elastic member 80 is a rubber member having a ring shape, and is adhered to the front surface 72a of the movable element 72 and the supporting ring 82. The high elastic member 81 is a disc spring having a ring shape having an elastic force higher than that of the low elastic member 80, and is adhered to the stopper 79 and the supporting ring 82.

The movable element 72 is biased in the backward direction of the slide pin 31 by the elastic force of each elastic member 80, 81, where a predetermined gap is ensured between the back surface 72b of the movable element 72 and the step portion 23b of the sleeve 21 at the time of no-pressurization to the fluid pressure chamber P2. The movable element 72 moves forward with the slide pin 31 and compresses the low elastic member 80 at the time of initial pressurization to the fluid pressure chambers P1, P2. At the time of continuation of the pressurization to the fluid pressure chambers P1, P2, the movable element 72 further moves forward with the slide pin 31 and compresses the low elastic member 80 to deform by a predetermined amount, and then compresses the high elastic member 81. In this case, the elastic members 80, 81 configuring the retract mechanism 71 have the elastic recovery amount defined as the pull-back amount of the caliper 25. In other words, at the time of high pressure pressurization to the fluid pressure chambers P1, P2, the pull-back amount of the caliper 25 is ensured by two types of elastic members 80, 81 having different elastic force since the deflection amount of the pads 12, 13 is large, and the elastic recovery amount of the low elastic member 80 only is defined as the pull-back amount of the caliper 25. Furthermore, the movable element 72 moves forward with the slide pin 31 so that the front surface 72a of the movable element 72 can be brought into contact with the stopper 79, and the movable element 72 functions as a positioning mechanism for defining the maximum compression deformation amount of the low elastic member 80.

As shown in FIG. 1, FIG. 2 and FIG. 6, when the operation fluid is supplied to the fluid pressure chamber P1 for pressurization, the piston 15 and the caliper 25 move forward to push the pads 12, 13 against the disc rotor 11. The piston 15 then moves forward in the direction of the arrow A in FIG. 2, and then the caliper 25 moves forward in the direction of the arrow B in FIG. 2.

When the operation fluid is supplied to the fluid pressure chamber P2 for pressurization, the slide pin 31 and the movable element 72 move forward. The movable element 72 moves forward with the slide pin 31 and compresses and deforms the low elastic member 80 at the time of low pressure input to the fluid pressure chamber P2. In this case, the compression deformation amount of the low elastic member 80 by the movable element 72 becomes the return amount of the slide pin 31, that is, the caliper 25.

When the operation fluid is discharged from the fluid pressure chambers P1, P2 for depressurization, the slide pin 31 and the movable element 72 integrally move backward by the restoring force of the compressed and deformed low elastic member 80. In this case, the slide pin 31 (caliper 25) is returned to the original position and the pushing against the disc rotor 11 by the pads 12, 13 is released since the slide pin 31 and the movable element 72 do not relatively move.

The movable element 72 moves forward with the slide pin 31 and compresses and deforms the low elastic member 80 and then compresses and deforms the high elastic member 81 at the time of high pressure input to the fluid pressure chamber P2. In this case, the compression deformation amount of the each elastic member 80, 81 by the movable element 72 becomes the return amount of the slide pin 31, that is, the caliper 25. When the pressurization to the fluid pressure chamber P2 is continued, the front surface 72a of the movable element 72 is brought into contact with the stopper 79 so that the movable element 72 stops, so that the compression deformation amount of the low elastic member 80 by the movable element 72 is defined, and the maximum return amount of the slide pin 31, that is, the caliper 25 by the low elastic member 80 is defined.

When the operation fluid is discharged from the fluid pressure chambers P1, P2 for depressurization, the slide pin 31 and the movable element 72 integrally move backward by the restoring force of each compressed and deformed elastic member 80, 81.

When the pads 12, 13 wear, the slide pin 31 moves forward more than necessary, and relatively moves with the movable element 72. In other words, when the operation fluid is supplied to the fluid pressure chamber P2 for pressurization, the slide pin 31 and the movable element 72 move forward, similar to the above. When the slide pin 31 and the movable element 72 are integrally moved forward and the low elastic member 80 is maximally compressed and deformed and the high elastic member 81 is compressed and deformed, the movable element 72 stops as the front surface 72a is brought into contact with the stopper 79. If the slide pin 31 and the movable element 72 move forward by greater than or equal to the compression deformation amount of each elastic member 80, 81, the forward movement of the slide pin 31 is permitted with respect to the stopped movable element 72 and the slide pin 31 moves forward by a predetermined amount, that is, the wear amount of the pads 12, 13. In this case as well, the compression deformation amount of each elastic member 80, 81 becomes the return amount of the slide pin 31, that is, the caliper 25 since the maximum compression deformation amount of the low elastic member 80 by the movable element 72 is defined.

When the operation fluid is discharged from the fluid pressure chambers P1, P2 for depressurization, the slide pin 31 and the movable element 72 integrally move backward by the restoring force of each compressed and deformed elastic member 80, 81. At the time of backward movement, the slide pin 31 and the movable element 72 do not relatively move, and hence the slide pin 31 (caliper 25) is returned by the compression deformation amount of each elastic member 80, 81, and the pushing to the disc rotor 11 by the pads 12, 13 is released. In this case, the relative position of the slide pin 31 and the movable element 72 becomes the position at which the slide pin 31 is moved forward by the wear amount of the pads 12, 13 with respect to the original position relationship, where the relative position is changed according to the wear amount of the pads 12, 13.

In the disc brake device of the third example, the elastic members 80, 81 that can be compressed and deformed when the caliper 25 moves forward are interposed between the slide pin 31 and the sleeve 21, and the movable element 72 that is movable following the deformation of the elastic members 80, 81 and that defines the compression deformation amount of the low elastic member 80 is arranged between the slide pin 31 and the sleeve 21, so that the relative movement of the slide pin 31 and the movable element 72 is permitted when the compression deformation amount of the low elastic member 80 becomes a predetermined value and the relative position of the slide pin 31 and the sleeve 21 is changed.

Therefore, at the time of the pressurization of the fluid pressure chamber P2, the caliper 25 and the piston 15 move forward and the movable element 72 moves forward with the slide pin 31 thus compressing and deforming the low elastic member 80, so that the pads 12, 13 can be pushed against the disc rotor 11 and the slide pin 31 and the movable element 72 can relatively move when the deformation amount of the low elastic member 80 becomes a predetermined value, whereas at the time of the depressurization of the fluid pressure chamber P2, the slide pin 31 and the movable element 72 are integrally returned by the deformation amount of the elastic members 80, 81, the slide pin 31 can be returned by the compression deformation amount of the elastic members 80, 81 regardless of the forward movement amount of the slide pin 31, and the relative position of the slide pin 31 and the sleeve 21 is changed by the positioning mechanism according to the wear of the pads 12, 13 thus appropriately maintaining the position of the caliper 25 and ensuring the stable retract function.

In the disc brake device of the third example, the low elastic member 80 and the high elastic member 81 capable of being compressed and deformed by the forward movement of the movable element 72 are arranged in series between the slide pin 31 and the sleeve 21. When the movable element 72 moves forward with the slide pin 31, the movable element 72 moves forward while compressing and deforming the low elastic member 80, and then moves forward while compressing and deforming the high elastic member 81 after maximally deforming the low elastic member 80. Therefore, the return amount of the slide pin 31 (caliper 25) by the two elastic members 80, 81 having different elastic properties continuously increases from the beginning, and becomes greater than the forward movement amount in the entire region, so that the defined return amount dependent on the pressure can be ensured in the entire region of the fluid pressure region, whereby a predetermined clearance amount can be ensured between the pads 12, 13 and the disc rotor 11, the occurrence of dragging phenomenon of the pads 12, 13 can be suppressed, and a stable braking feeling can be obtained.

Fourth Example

Figure 7:
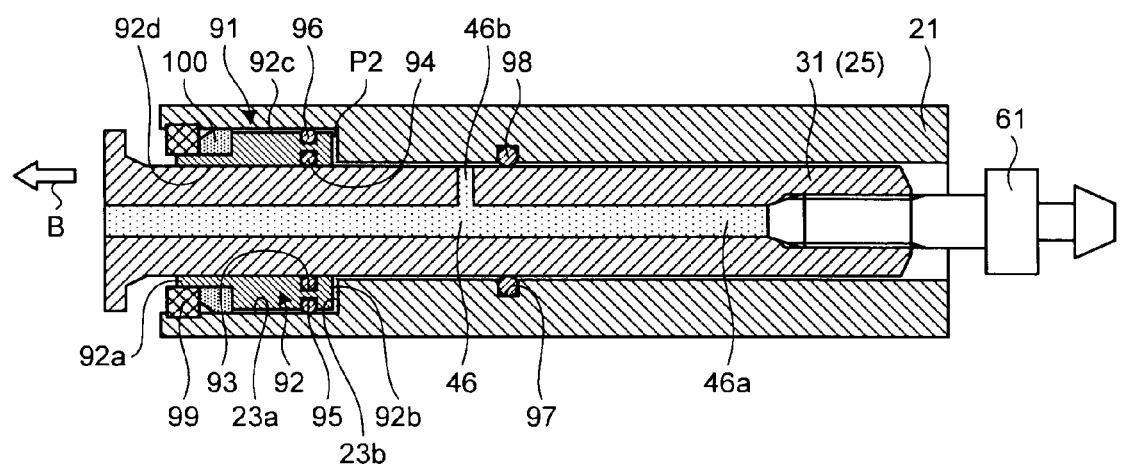
FIG. 7 is a cross-sectional view showing a slide mechanism in a disc brake device according to a fourth example of the present invention.

FIG. 7 is a cross-sectional view showing a slide mechanism in a disc brake device according to a fourth example of the present invention. The entire configuration of the disc brake device of the present example is substantially similar to the first example described above and will be described using FIG. 1 and FIG. 2, where the same reference numerals are denoted for members having functions similar to those described in the example and redundant description will be omitted.

As shown in FIG. 7, in the disc brake device of the fourth example, a retract mechanism 91 is arranged between the slide pin 31 and the sleeve 21, which retract mechanism 91 includes a positioning mechanism capable of changing the relative position of the slide pin 31 and the sleeve 21.

In other words, the slide pin 31 is supported in a freely movable manner in the axial direction with a predetermined gap in the fit-in hole 23 of the sleeve 21. The accommodation groove 23a continuing in the peripheral direction is formed over a predetermined length on the inner peripheral surface of the fit-in hole 23, which accommodation groove 23a is opened in the forward direction of the slide pin 31 (caliper 25)

and has a step portion 23b formed in the backward direction. A movable element 92 serving as a positioning mechanism that can relatively move with the slide pin 31 is inserted in the accommodation groove 23a of the sleeve 21. The movable element 92 has a cylindrical shape and has a square cross-sectional shape, and includes a step portion 92a having a narrow diameter formed on the opening side of the accommodation groove 23a, a back surface 92b facing the step portion 23b, an outer peripheral surface 92c facing the inner wall surface of the accommodation groove 23a, and an inner peripheral surface 92d facing the outer peripheral surface of the slide pin 31.

The movable element 92 has a ring groove 93 having a ring shape formed on the inner peripheral surface 92d, and a seal member 94 that exhibits the seal function with the slide pin 31 is attached to the ring groove 93. The movable element 92 has a ring groove 95 having a ring shape formed on the outer peripheral surface 92c, and a seal member 96 that exhibits the seal function with the sleeve 21 is attached to the ring groove 95. The seal member 94 has a higher elastic force than that of the seal member 96. Furthermore, the sleeve 21 has a ring groove 97 having a ring shape formed on the inner peripheral surface, and a seal member 98 that exhibits the seal function with the slide pin 31 is attached to the ring groove 97.

The fluid pressure passage 46 has the second passage 46b communicating to between the slide pin 31 and the sleeve 21. The communicating portion of the second passage 46b is the fluid pressure chamber P2 partitioned by each seal member 94, 96, 98. That is, the operation fluid supplied to the fluid pressure chamber P2 from the fluid pressure chamber P1 through the fluid pressure passage 46 is sealed between the slide pin 31, the sleeve 21, and the movable element 92 so that the leakage to the outside is prevented.

A stopper 99 having a ring shape is fixed to the inner peripheral surface on the opening side in the accommodation groove 23a. An elastic member 100 is arranged in the accommodation groove 23a while being positioned between the movable element 92 and the stopper 99 in a sealed space thereof. The elastic member 100 is a rubber member having a ring shape, and is adhered to the sleeve 21, the movable element 92, and the stopper 99. In this case, the step portion 92a of the movable element 92 is positioned on the inner peripheral side of the stopper 99 and the elastic member 100, and the elastic member 100 is not brought into contact with the slide pin 31.

The movable element 92 is biased in the backward direction of the slide pin 31 by the elastic force of the elastic member 100, where a predetermined gap is ensured between the back surface 92b of the movable element 92 and the step portion 23b of the sleeve 21 at the time of no-pressurization to the fluid pressure chamber P2. At the time of pressurization to the fluid pressure chambers P1, P2, the movable element 92 moves forward with the slide pin 31 thus compressing the elastic member 100. In this case, the elastic member 100 configuring the retract mechanism 91 has the elastic recovery amount defined as the maximum pull-back amount of the caliper 25. Furthermore, the movable element 92 moves forward with the slide pin 31 so that the movable element 92 can be brought into contact with the stopper 99, and the movable element 92 functions as a positioning mechanism for defining the compression deformation amount of the elastic member 100.

As shown in FIG. 1, FIG. 2 and FIG. 7, when the operation fluid is supplied to the fluid pressure chamber P1 for pressurization, the piston 15 and the caliper 25 move forward to push the pads 12, 13 against the disc rotor 11. The piston 15 then moves forward in the direction of the arrow A in FIG. 2, and then the caliper 25 moves forward in the direction of the arrow B in FIG. 2.

When the operation fluid is supplied to the fluid pressure chamber P2 for pressurization, the slide pin 31 and the movable element 92 move forward. The movable element 92 moves forward with the slide pin 31 and compresses and deforms the elastic member 100 at the time of low pressure input to the fluid pressure chamber P2. In this case, the compression deformation amount of the elastic member 100 by the movable element 92 becomes the return amount of the slide pin 31, that is, the caliper 25. When the pressurization to the fluid pressure chamber P2 is continued, the movable element 92 further compresses the elastic member 100 and stops as the rigidity thereof becomes high, so that the compression deformation amount of the elastic member 100 by the movable element 92 is defined, and the maximum return amount of the slide pin 31, that is, the caliper 25 is defined.

When the operation fluid is discharged from the fluid pressure chambers P1, P2 for depressurization, the slide pin 31 and the movable element 92 integrally move backward by the restoring force of the compressed and deformed elastic member 100. In this case, the slide pin 31 (caliper 25) is returned to the original position and the pushing against the disc rotor 11 by the pads 12, 13 is released since the slide pin 31 and the movable element 92 do not relatively move.

When the pads 12, 13 wear, the slide pin 31 moves forward more than necessary, and relatively moves with the movable element 92. In other words, when the operation fluid is supplied to the fluid pressure chamber P2 for pressurization, the slide pin 31 and the movable element 92 move forward, similar to the above. When the slide pin 31 and the movable element 92 integrally move forward and the elastic member 100 is compressed and deformed by a predetermined amount, the movable element 92 stops. If the slide pin 31 and the movable element 92 move forward by greater than or equal to the compression deformation amount of the elastic member 100, the forward movement of the slide pin 31 is permitted with respect to the stopped movable element 92 and the slide pin 31 moves forward by a predetermined amount, that is, the wear amount of the pads 12, 13. In this case as well, the compression deformation amount of the elastic member 100 becomes the return amount of the slide pin 31, that is, the caliper 25 since the compression deformation amount of the elastic member 100 by the movable element 92 is defined.

When the operation fluid is discharged from the fluid pressure chambers P1, P2 for depressurization, the slide pin 31 and the movable element 92 integrally move backward by the restoring force of the compressed and deformed elastic member 100. At the time of the backward movement, the slide pin 31 (caliper 25) is returned by the compression deformation amount of the elastic member 100 and the pushing against the disc rotor 11 by the pads 12, 13 is released since the slide pin 31 and the movable element 92 do not relatively move. In this case, the relative position of the slide pin 31 and the movable element 92 becomes the position at which the slide pin 31 is moved forward by the wear amount of the pads 12, 13 with respect to the original position relationship, where the relative position is changed according to the wear amount of the pads 12, 13.

In the disc brake device of the fourth example, the elastic member 100 that can be compressed and deformed when the caliper 25 moves forward is interposed between the slide pin 31 and the sleeve 21, and the movable element 92 that is movable following the deformation of the elastic member 100 and that defines the compression deformation amount of the elastic member 100 is arranged between the slide pin 31 and the sleeve 21, so that the relative movement of the slide pin 31 and the movable element 92 is permitted when the compression deformation amount of the elastic member 100 becomes a predetermined value and the relative position of the slide pin 31 and the sleeve 21 is changed.

Therefore, the slide pin 31 can be returned by the compression deformation amount of the elastic member 100 regardless of the forward movement amount of the slide pin 31, and the relative position of the slide pin 31 and the sleeve 21 can be changed by the movable element 92 serving as the positioning mechanism according to the wear of the pads 12, 13, so that the position of the caliper 25 can be appropriately maintained and the stable retract function can be ensured.

In the disc brake device of the fourth example, the elastic member 100 is arranged between the movable element 92 and the stopper 99 in the accommodation groove 23a of the sleeve 21, the step portion 92a of the movable element 92 is positioned on the inner peripheral side of the stopper 99 and the elastic member 100, and the frictional force (elastic force of the seal member 94) between the slide pin 31 and the movable element 92 is set to be greater than the starting load of the slide pin 31 and the movable element 92. Therefore, the starting load of the slide pin 31 and the movable element 92 can be reduced and the startup thereof can be stabilized.

Fifth Example

Figure 8:
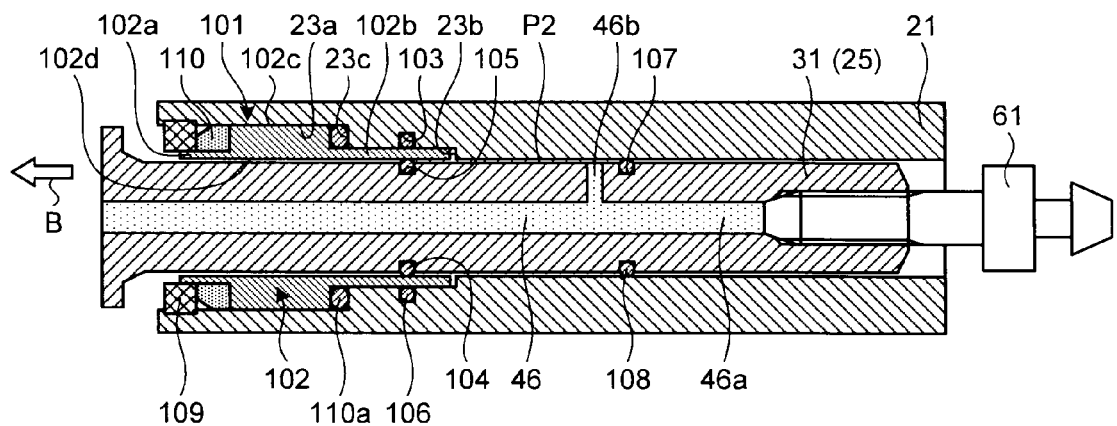
FIG. 8 is a cross-sectional view showing a slide mechanism in a disc brake device according to a fifth example of the present invention.

FIG. 8 is a cross-sectional view showing a slide mechanism in a disc brake device according to a fifth example of the present invention. The entire configuration of the disc brake device of the present example is substantially similar to the first example described above and will be described using FIG. 1 and FIG. 2, where the same reference numerals are denoted for members having functions similar to those described in the example and redundant description will be omitted.

As shown in FIG. 8, in the disc brake device of the fifth example, a retract mechanism 101 is arranged between the slide pin 31 and the sleeve 21, which retract mechanism 101 includes a positioning mechanism capable of changing the relative position of the slide pin 31 and the sleeve 21.

In other words, the slide pin 31 is supported in a freely movable manner in the axial direction with a predetermined gap in the fit-in hole 23 of the sleeve 21. The accommodation groove 23a continuing in the peripheral direction is formed over a predetermined length on the inner peripheral surface of the fit-in hole 23, which accommodation groove 23a is opened in the forward direction of the slide pin 31 (caliper 25) and has a first step portion 23b formed in the backward direction and a second step portion 23c formed at the intermediate portion. A movable element 102 serving as a positioning mechanism that can relatively move with the slide pin 31 is inserted in the accommodation groove 23a of the sleeve 21. The movable element 102 has a cylindrical shape and has a square cross-sectional shape, and includes a step portion 102a having a narrow diameter formed on the opening side of the accommodation groove 23a, a step portion 102b that engages the step portions 23b, 23c, an outer peripheral surface 102c facing the inner wall surface of the accommodation groove 23a, and an inner peripheral surface 102d facing the outer peripheral surface of the slide pin 31.

The slide pin 31 has a ring groove 103 having a ring shape formed on the outer peripheral surface, and a seal member 104 that exhibits the seal function with the inner peripheral surface 102d of the movable element 102 is attached to the ring groove 103. The sleeve 21 has a ring groove 105 having a ring shape formed on the inner peripheral surface, and a seal member 106 that exhibits the seal function with the outer peripheral surface of the step portion 102b of the movable element 102 is attached to the ring groove 105. The seal member 104 has a higher elastic force than that of the seal member 106. Furthermore, the slide pin 31 has a ring groove 107 having a ring shape formed on the outer peripheral surface, and a seal member 108 that exhibits the seal function with the sleeve 21 is attached to the ring groove 107.

The fluid pressure passage 46 has the second passage 46b communicating to between the slide pin 31 and the sleeve 21. The communicating portion of the second passage 46b is the fluid pressure chamber P2 partitioned by each seal member 104, 106, 108. That is, the operation fluid supplied to the fluid pressure chamber P2 from the fluid pressure chamber P1 through the fluid pressure passage 46 is sealed between the slide pin 31, the sleeve 21, and the movable element 102 so that the leakage to the outside is prevented.

A stopper 109 having a ring shape is fixed to the inner peripheral surface on the opening side in the accommodation groove 23a. An elastic member 110 is arranged in the accommodation groove 23a while being positioned between the movable element 102 and the stopper 109 in a sealed space thereof. An elastic member 110a is arranged between a back surface 101b of the movable element 102 and the accommodation groove 23a of the sleeve 21. Each elastic member 110, 110a is a rubber member having a ring shape, and elastically supports the movable element 102 in the sleeve 21 and the accommodation groove 23a. In this case, the step portion 102a of the movable element 102 is positioned on the inner peripheral side of the stopper 109 and the elastic member 110, and the elastic member 110 is not brought into contact with the slide pin 31.

The movable element 102 is biased in the backward direction of the slide pin 31 by the elastic force of the elastic member 110, where a predetermined gap is ensured between the back surface of the step portion 102b of the movable element 102 and the first step portion 23b of the sleeve 21 at the time of no-pressurization to the fluid pressure chamber P2. At the time of pressurization to the fluid pressure chambers P1, P2, the movable element 102 moves forward with the slide pin 31 thus compressing the elastic member 110. In this case, the elastic member 110 configuring the retract mechanism 101 has the elastic recovery amount defined as the maximum pull-back amount of the caliper 25. Furthermore, the movable element 102 moves forward with the slide pin 31 and the movable element 102 compresses the elastic member 110 by a maximum amount, so that the movable element 102 functions as a positioning mechanism for defining the compression deformation amount of the elastic member 110.

In the fifth example, the pressure receiving area of the fluid pressure of the operation fluid is set to be smaller than the transmission area for transmitting the fluid pressure of the operation fluid to the elastic member 110 at the time of pressurization of the fluid pressure chamber P2 by the step portion 102b of the movable element 102. In other words, when the operation fluid is supplied to the fluid pressure chamber P2 for pressurization, the fluid pressure thereof acts on the back surface of the step portion 102b of the movable element 102, so that the area of the back surface of the step portion 102b becomes the pressure receiving area of the operation fluid. In this case, the fluid pressure of the operation fluid is transmitted to the elastic member 110 as the movable element 102 moves forward thus compressing the elastic member 110, so that the increase in the fluid amount of the operation fluid between the sleeve 21 and the slide pin 31 can be permitted and the movable element 102 can move forward. Therefore, the area of the front surface of the movable element 102 becomes the transmission area for transmitting the fluid pressure of the operation fluid to the elastic member 110.

As shown in FIG. 1, FIG. 2 and FIG. 8, when the operation fluid is supplied to the fluid pressure chamber P1 for pressurization, the piston 15 and the caliper 25 move forward to push the pads 12, 13 against the disc rotor 11. The piston 15 then moves forward in the direction of the arrow A in FIG. 2, and then the caliper 25 moves forward in the direction of the arrow B in FIG. 2.

When the operation fluid is supplied to the fluid pressure chamber P2 for pressurization, the slide pin 31 and the movable element 102 move forward. The movable element 102 moves forward with the slide pin 31 and compresses and deforms the elastic member 110 at the time of low pressure input to the fluid pressure chamber P2. In this case, the compression deformation amount of the elastic member 110 by the movable element 102 becomes the return amount of the slide pin 31, that is, the caliper 25. When the pressurization to the fluid pressure chamber P2 is continued, the movable element 102 further compresses the elastic member 110 and stops as the rigidity thereof becomes high, so that the compression deformation amount of the elastic member 110 by the movable element 102 is defined, and the maximum return amount of the slide pin 31, that is, the caliper 25 is defined.

When the operation fluid is discharged from the fluid pressure chambers P1, P2 for depressurization, the slide pin 31 and the movable element 102 integrally move backward by the restoring force of the compressed and deformed elastic member 110. In this case, the slide pin 31 (caliper 25) is returned to the original position and the pushing against the disc rotor 11 by the pads 12, 13 is released since the slide pin 31 and the movable element 102 do not relatively move.

When the pads 12, 13 wear, the slide pin 31 moves forward more than necessary, and relatively moves with the movable element 102. In other words, when the operation fluid is supplied to the fluid pressure chamber P2 for pressurization, the slide pin 31 and the movable element 102 move forward, similar to the above. When the slide pin 31 and the movable element 102 integrally move forward and the elastic member 110 is compressed and deformed by a predetermined amount, the movable element 102 stops. If the slide pin 31 and the movable element 102 move forward by greater than or equal to the compression deformation amount of the elastic member 110, the forward movement of the slide pin 31 is permitted with respect to the stopped movable element 102 and the slide pin 31 moves forward by a predetermined amount, that is, the wear amount of the pads 12, 13. In this case as well, the compression deformation amount of the elastic member 110 becomes the return amount of the slide pin 31, that is, the caliper 25 since the compression deformation amount of the elastic member 110 by the movable element 102 is defined.

When the operation fluid is discharged from the fluid pressure chambers P1, P2 for depressurization, the slide pin 31 and the movable element 102 integrally move backward by the restoring force of the compressed and deformed elastic member 110. At the time of the backward movement, the slide pin 31 (caliper 25) is returned by the compression deformation amount of the elastic member 110 and the pushing against the disc rotor 11 by the pads 12, 13 is released since the slide pin 31 and the movable element 102 do not relatively move. In this case, the relative position of the slide pin 31 and the movable element 102 becomes the position at which the slide pin 31 is moved forward by the wear amount of the pads 12, 13 with respect to the original position relationship, where the relative position is changed according to the wear amount of the pads 12, 13.

In the disc brake device of the fifth example, the elastic member 110 that can be compressed and deformed when the caliper 25 moves forward is interposed between the slide pin 31 and the sleeve 21, and the movable element 102 that is movable following the deformation of the elastic member 110 and that defines the compression deformation amount of the elastic member 110 is arranged between the slide pin 31 and the sleeve 21, so that the relative movement of the slide pin 31 and the movable element 102 is permitted when the compression deformation amount of the elastic member 110 becomes a predetermined value and the relative position of the slide pin 31 and the sleeve 21 is changed.

Therefore, the slide pin 31 can be returned by the compression deformation amount of the elastic member 110 regardless of the forward movement amount of the slide pin 31, and the relative position of the slide pin 31 and the sleeve 21 can be changed by the movable element 102 serving as the positioning mechanism according to the wear of the pads 12, 13, so that the position of the caliper 25 can be appropriately maintained and the stable retract function can be ensured.

In the disc brake device of the fifth example, the step portion 102b is provided at the back part of the movable element 102, and the second step portion 23c is provided at the accommodation groove 23a of the sleeve 21, so that a step shape in which the pressure receiving area of the fluid pressure of the operation fluid becomes smaller than the transmission area for transmitting the fluid pressure of the operation fluid to the elastic member 110 is formed. Therefore, the pressure receiving area of the fluid pressure of the operation fluid can be set to a predetermined value with a simple configuration, and lower cost can be achieved. Furthermore, the consumption of fluid amount can be reduced by setting the pressure receiving area small, whereby the feeling of the brake pedal operation can be improved.

Sixth Example

Figure 9:
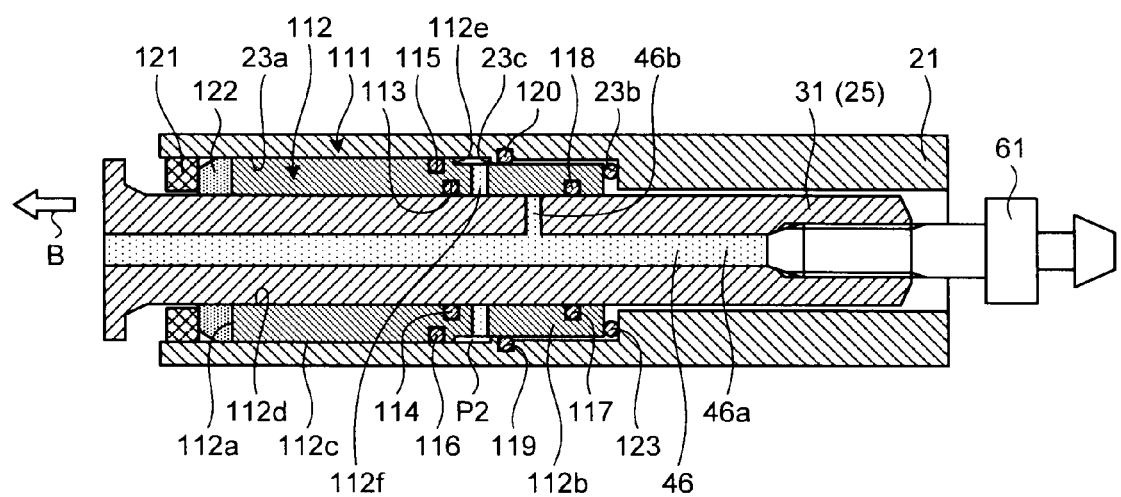
FIG. 9 is a cross-sectional view showing a slide mechanism in a disc brake device according to a sixth example of the present invention.

FIG. 9 is a cross-sectional view showing a slide mechanism in a disc brake device according to a sixth example of the present invention. The entire configuration of the disc brake device of the present example is substantially similar to the first example described above and will be described using FIG. 1 and FIG. 2, where the same reference numerals are denoted for members having functions similar to those described in the example and redundant description will be omitted.

As shown in FIG. 9, in the disc brake device of the sixth example, a retract mechanism 111 is arranged between the slide pin 31 and the sleeve 21, which retract mechanism 111 includes a positioning mechanism capable of changing the relative position of the slide pin 31 and the sleeve 21.

In other words, the slide pin 31 is supported in a freely movable manner in the axial direction with a predetermined gap in the fit-in hole 23 of the sleeve 21. The accommodation groove 23a continuing in the peripheral direction is formed over a predetermined length on the inner peripheral surface of the fit-in hole 23, which accommodation groove 23a is opened in the forward direction of the slide pin 31 (caliper 25) and has a first step portion 23b formed in the backward direction and a second step portion 23c formed at the intermediate portion. A movable element 112 serving as a positioning mechanism that can relatively move with the slide pin 31 is inserted in the accommodation groove 23a of the sleeve 21. The movable element 112 has a cylindrical shape and has a square cross-sectional shape, and includes a front surface 112a formed on the opening side of the accommodation groove 23a, a back surface 112b facing the first step portion 23*b*, an outer peripheral surface 112*c* facing the inner wall surface of the accommodation groove 23*a*, an inner peripheral surface 112*d* facing the outer peripheral surface of the slide pin 31, and a step portion 112*e* facing the second step portion 23*c*.

The movable element 112 has a ring groove 113 having a ring shape formed on the inner peripheral surface 112*d*, and a seal member 114 that exhibits the seal function with the outer peripheral surface of the slide pin 31 is attached to the ring groove 113. The movable element 112 has a ring groove 115 having a ring shape formed on the outer peripheral surface 112*c*, and a seal member 116 that exhibits the seal function with the accommodation groove 23*a* of the sleeve 21 is attached to the ring groove 115. The movable element 112 has a ring groove 117 having a ring shape formed on the inner peripheral surface 112*d*, and a seal member 118 that exhibits the seal function with the outer peripheral surface of the slide pin 31 is attached to the ring groove 117. The sleeve 21 has a ring groove 119 having a ring shape formed on the inner peripheral surface of the accommodation groove 23*a*, and a seal member 120 that exhibits the seal function with the outer peripheral surface of the step portion 122*e* of the movable element 112 is attached to the ring groove 119.

The fluid pressure passage 46 has the second passage 46*b* communicating to between the slide pin 31 and the sleeve 21. The communicating portion of the second passage 46*b* is the fluid pressure chamber P2 partitioned by each seal member 114, 116, 118, 120 where the outer peripheral side of the slide pin 31 and the inner peripheral side of the sleeve 21 communicate by a through hole 112*f* formed in the movable element 112. That is, the operation fluid supplied to the fluid pressure chamber P2 from the fluid pressure chamber P1 through the fluid pressure passage 46 is sealed between the slide pin 31, the sleeve 21, and the movable element 112 so that the leakage to the outside is prevented.

A stopper 121 having a ring shape is fixed to the inner peripheral surface on the opening side in the accommodation groove 23*a*. An elastic member 122 is arranged in the accommodation groove 23*a* while being positioned between the movable element 112 and the stopper 121. An elastic member 123 is arranged between the back surface of the movable element 112 and the first step portion 23*b* of the sleeve 21. The elastic members 122, 123 are rubber members having a ring shape, and elastically support the movable element 112 in the accommodation groove 23*a*. That is, the elastic member 122, 123 floating support the movable element 112 in the accommodation groove 23*a*, that is, biasedly support the movable element 112 so as to be movable in the forward direction and the backward direction of the slide pin 31.

Therefore, the movable element 112 moves forward with the slide pin 31 and compresses the elastic member 122 at the time of initial pressurization to the fluid pressure chamber P2, and the movable element 112 moves backward with the slide pin 31 and compresses the elastic member 123 at the time of depressurization.

The pressure receiving area of the fluid pressure of the operation fluid is set to be smaller than the transmission area for transmitting the fluid pressure of the operation fluid to the elastic member 122 at the time of pressurization of the fluid pressure chamber P2 by the step portion 122*e* of the movable element 112. In other words, when the operation fluid is supplied to the fluid pressure chamber P2 for pressurization, the fluid pressure thereof acts on the back surface of the step portion 112*e* of the movable element 112, so that the area of the back surface of the step portion 112*e* becomes the pressure receiving area of the operation fluid. In this case, the fluid pressure of the operation fluid is transmitted to the elastic member 122 as the movable element 112 moves forward thus compressing the elastic member 122, so that the increase in the fluid amount of the operation fluid between the sleeve 21 and the slide pin 31 can be permitted and the movable element 112 can move forward. Therefore, the area of the front surface of the movable element 112 becomes the transmission area for transmitting the fluid pressure of the operation fluid to the elastic member 122.

The operation of the entire retract mechanism 111 is substantially similar to each example described before, and thus the description will be omitted.

In the disc brake device of the sixth example, the step portion 112*e* is provided on the outer peripheral side of the movable element 112, and the second step portion 23*c* is provided at the accommodation groove 23*a* of the sleeve 21, so that a step shape in which the pressure receiving area of the fluid pressure of the operation fluid becomes smaller than the transmission area for transmitting the fluid pressure of the operation fluid to the elastic member 122 is formed. Therefore, the pressure receiving area of the fluid pressure of the operation fluid can be set to a predetermined value with a simple configuration, and lower cost can be achieved. Furthermore, the consumption of fluid amount can be reduced by setting the pressure receiving area small, whereby the feeling of the brake pedal operation can be improved.

In the fifth and sixth examples described above, the step portion 102*b*, 112*e* is provided at the movable element 102, 112, and the second step portion 23*c* is provided at the accommodation groove 23*a* of the sleeve 21, but such configuration is not the sole case. In other words, the step shape in which at least one of the pressure receiving side of the slide pin, the movable element, and the sleeve has a small diameter merely needs to be formed.

In each example described above, the sleeve 21, 22 are arranged in the mounting bracket 14 fixed to the vehicle body side, and the slide pin 31, 32 fixed to the arm 29, 30 of the caliper 25 are fitted in a freely movable manner in the fit-in hole 23, 24 of the sleeve 21, 22, so that the caliper 25 is supported in a freely movable manner with respect to the mounting bracket 14, but this configuration is not the sole case. In other words, the sleeve may be arranged on the caliper, and the slide pin fixed to the arm of the mounting bracket may be fitted in a freely movable manner to the fit-in hole of the sleeve so that the caliper is supported in a freely movable manner with respect to the mounting bracket.

In each example described above, the piston 15 that is relatively movable is accommodated in the caliper 25 so that the fluid pressure chamber P1 is arranged between the caliper 25 and the piston 15, a pair of friction pads 12, 13 can be pushed against both sides of the disc rotor 11 when the caliper 25 and the piston 15 relatively move at the time of pressurization of the fluid pressure chamber P1, and the pressurization force of the fluid pressure chamber P1 may act between the slide pin 31, 32 and the sleeve 21, 22, but this configuration is not the sole case. In other words, when the caliper 25 and the piston 15 relatively move and the slide pin 31, 32 and the sleeve 21, 22 cooperate to move relatively without supplying the operation fluid of the fluid pressure chamber P1 between the slide pin 31, 32 and the sleeve 21, 22, the relative position of the slide pin and the sleeve can be changed by the positioning mechanism.

INDUSTRIAL APPLICABILITY

Therefore, the disc brake device according to the present invention appropriately changes the position of the caliper according to the wear of the pad and ensures stable retract function by arranging the positioning mechanism capable of changing the relative position between the slide pin and the sleeve that configure the slide mechanism, and may be suitably applied to any disc brake device.

REFERENCE SIGNS LIST

11 DISC ROTOR
12 INNER PAD (FRICTION PAD)
13 OUTER PAD (FRICTION PAD)
14 MOUNTING BRACKET
15 PISTON
16 CYLINDER MECHANISM
21, 22 SLEEVE
25 CALIPER
29, 30 ARM
31, 32 SLIDE PIN
46 FLUID PRESSURE PASSAGE
51, 71, 91, 101, 111 RETRACT MECHANISM
52, 72, 92, 102, 112 MOVABLE ELEMENT (POSITIONING MECHANISM)
54, 56, 58, 74, 76, 78, 94, 96, 98, 104, 106, 108, 114, 116, 118, 120 SEAL MEMBER
59, 79, 99, 109, 121 STOPPER
60, 62, 100, 110, 122, 123 ELASTIC MEMBER
61 BREEDER
80 LOE ELASTIC MEMBER
81 HIGH ELASTIC MEMBER
P1, P2 FLUID PRESSURE CHAMBER

The invention claimed is:

1. A disc brake device comprising:
a disc rotor that rotates about a rotation axis center;
a friction pad that faces a friction surface of the disc rotor;
a caliper capable of pushing the friction pad against the friction surface of the disc rotor;
a mounting that supports the caliper in a freely movable manner to a vehicle body side through a slide mechanism including a slide pin and a sleeve; and
a positioning mechanism capable of changing a relative position of the slide pin and the sleeve,
wherein the positioning mechanism includes
an accommodation groove formed on an inner peripheral surface of the sleeve,
a movable element inserted in the accommodation groove and relatively movable with the slide pin, and
an elastic member provided in the accommodation groove at an opening side thereof and adjacent to the movable element.

2. The disc brake device according to claim 1, wherein a the positioning mechanism pulls back the caliper when the caliper moves forward.

3. The disc brake device according to claim 2, wherein the positioning mechanism is defined with a maximum pull-back amount of the caliper.

4. The disc brake device according to claim 3, wherein the positioning mechanism changes a relative position of the slide pin and the sleeve when a relative movement amount of the slide pin and the sleeve exceeds the maximum pull-back amount of the caliper in the positioning mechanism.

5. The disc brake device according to claim 3, wherein the positioning mechanism changes a relative position of the slide pin and the sleeve when a relative movement amount of the slide pin and the sleeve exceeds a predetermined pull-back amount set in advance in the caliper in the positioning mechanism.

6. The disc brake device according to claim 1,
wherein the elastic member of the positioning mechanism is compressed and deformed when the caliper moves forward,
wherein the movable element of the positioning mechanism moves following the deformation of the elastic member and to define a maximum compression deformation amount of the elastic member, and
wherein the positioning mechanism allows a relative movement of the slide pin and the movable element or the sleeve and the movable element when the compression deformation amount of the elastic member becomes a maximum to change the relative position of the slide pin and the sleeve.

7. The disc brake device according to claim 1,
wherein the elastic member of the positioning mechanism is compressed and deformed when the caliper moves forward,
wherein the movable element of the positioning mechanism moves following the deformation of the elastic member and to define a maximum compression deformation amount of the elastic member, and
wherein the positioning mechanism allows a relative movement of the slide pin and the movable element or the sleeve and the movable element when the compression deformation amount of the elastic member becomes a predetermined value set in advance to change the relative position of the slide pin and the sleeve.

8. The disc brake device according to claim 6, wherein the elastic member includes a plurality of elastic members having different elastic properties, the plurality of elastic members being arranged in series among the slick pin, the movable element, and the sleeve.

9. The disc brake device according to claim 8, wherein the elastic members are arranged between the slide pin and the movable element, and between the mol able element and the sleeve.

10. The disc brake device according to claim 1, further comprising:
a fluid pressure chamber provided between the caliper and the piston by accommodating a relatively movable piston in the caliper,
wherein the pair of friction pads are capable of pushing against the friction surface positioned on both sides of the disc rotor when the caliper and the piston are relatively moved at a time of pressurization of the fluid pressure chamber, and a pressurization force of the fluid pressure chamber acts between the slide pin and the sleeve.

11. The disc brake device according to claim 10, wherein a starting load of the caliper is set to be greater than a starting load of the piston.

12. The disc brake device according to claim 7, wherein at least one pressure receiving side of the slide pin, the movable element, and the sleeve is formed to a step shape having a small diameter.

13. The disc brake device according to claim 1, wherein the slide pin is formed with a fluid pressure passage that acts a hydraulic pressure of the fluid pressure chamber between the slide pin and the sleeve, and includes a breeder that discharges an air mixed in the fluid pressure passage.

14. The disc brake device according to claim 7, wherein the elastic member includes a plurality of elastic members having different elastic properties, the plurality of elastic members are arranged in series among the slide pin, the movable element, and the sleeve.

15. The disc brake device according to claim 2, further comprising:
   a fluid pressure chamber provided between the caliper and the piston by accommodating a relatively movable piston in the caliper,
   wherein the pair of friction pads are capable of pushing against the friction surface positioned on both sides of the disc rotor when the caliper and the piston are relatively moved at a time of pressurization of the fluid pressure chamber, and a pressurization force of the fluid pressure chamber acts between the slide pin and the sleeve.

16. The disc brake device according to claim 3, further comprising:
   a fluid pressure chamber provided between the caliper and the piston by accommodating a relatively movable piston in the caliper,
   wherein the pair of friction pads are capable of pushing against the friction surface positioned on both sides of the disc rotor when the caliper and the piston are relatively at a time of pressurization of the fluid pressure chamber, and a pressurization force of the fluid pressure chamber acts between the slide pin and the sleeve.

17. The disc brake device according to claim 4, further comprising:
   a fluid pressure chamber provided between the caliper and the piston by accommodating a relatively movable piston in the caliper,
   wherein the pair of friction pads are capable of pushing against the friction surface positioned on both sides of the disc rotor when the caliper and the piston are relatively moved at a time of pressurization of the fluid pressure chamber, and a pressurization force of the fluid pressure chamber acts between the slide pin and the sleeve.

18. The disc brake device according to claim 5, further comprising:
   a fluid pressure chamber provided between the caliper and the piston by accommodating a relatively movable piston in the caliper,
   wherein the pair of friction pads are capable of pushing against the friction surface positioned on both sides of the disc rotor when the caliper and the piston are relatively moved at a time of pressurization of the fluid pressure chamber, and a pressurization force of the fluid pressure chamber acts between the slide pin and the sleeve.

19. The disc brake device according to claim 6, further comprising:
   a fluid pressure chamber provided between the caliper and the piston by accommodating a relatively movable piston in the caliper,
   wherein the pair of friction pads are capable of pushing against the friction surface positioned on both sides of the disc rotor when the caliper and the piston are relatively moved at a time of pressurization of the fluid pressure chamber, and a pressurization force of the fluid pressure chamber acts between the slide pin and the sleeve.

20. The disc brake device according to claim 7, further comprising:
   a fluid pressure chamber provided between the caliper and the piston by accommodating a relatively movable piston in the caliper,
   wherein the pair of friction pads are capable of pushing against the friction surface positioned on both sides of the disc rotor when the caliper and the piston are relatively moved at a time of pressurization of the fluid pressure chamber, and a pressurization force of the fluid pressure chamber acts between the slide pin and the sleeve.

* * * * *